May 3, 1960 E. W. VAN WINKLE 2,935,558
ELECTRONIC CAMERA FOCUSING APPARATUS
Filed March 8, 1954
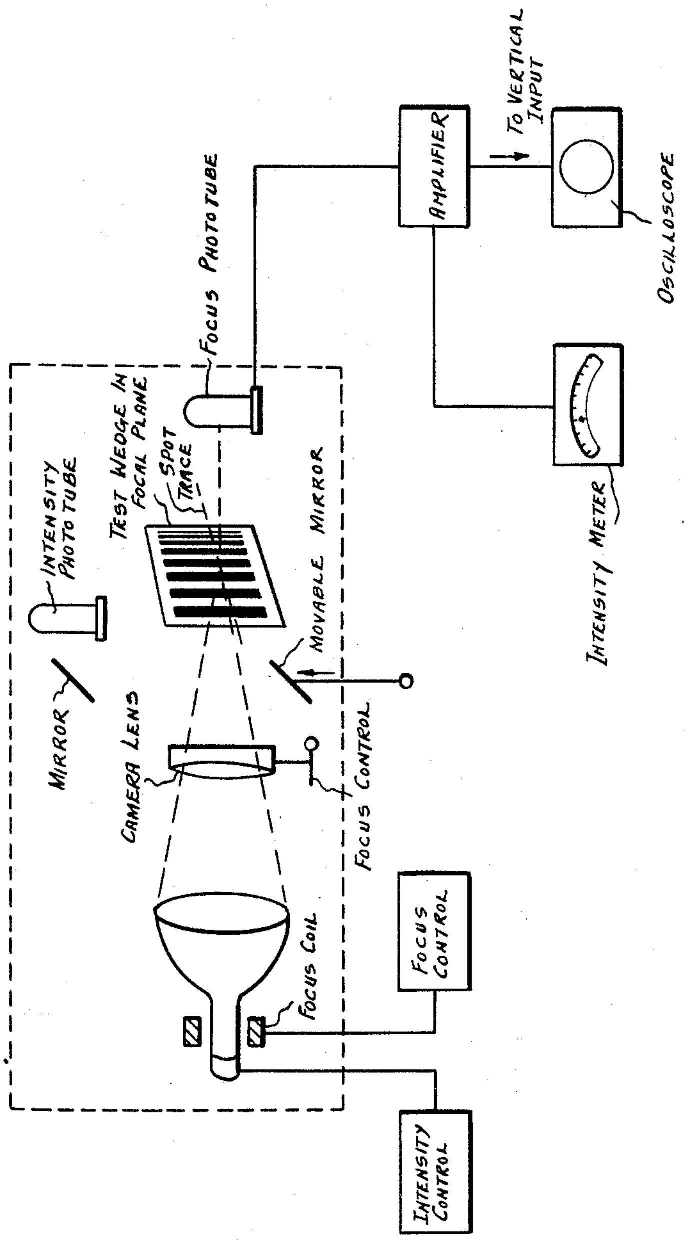
INVENTOR.
EDGAR W. VAN WINKLE
BY George Lipkin
Lee J. Huntzberger
ATTORNEYS United States Patent Office 2,935,558

Patented May 3, 1960

2,935,558

ELECTRONIC CAMERA FOCUSING APPARATUS

Edgar W. Van Winkle, Rutherford, N.J., assignor to the United States of America as represented by the Secretary of the Navy Application March 8, 1954, Serial No. 414,916

8 Claims. (Cl. 178—6.7)

This invention relates to a light intensity metering device and more particularly to a light intensity metering device adapted to aid in focusing the spot of a cathode ray tube, and adapted to aid in selecting the average intensity and the dynamic intensity range of the spot of a cathode ray tube, and adapted to aid in focusing a recording camera associated with a cathode ray tube.

This invention is particularly useful in facsimile recording systems, but more generally is adapted to be used in any electronic system that includes a cathode ray tube. The usefulness of the invention extends to an electronic system that includes a camera arranged to record the instantaneous light-intensity variations of an intensity-modulated cathode ray tube spot. In a facsimile recording system including a cathode ray tube the spot size determines the width of the recorded line; the width of the recorded line must bear a predetermined relationship to the width of a scanned line at the transmitter end of the facsimile system to provide a good facsimile copy. Therefore the spot size is critical.

In one type of facsimile recording system that includes a cathode ray tube, the spot repeatedly traverses the same linear portion of the face of the cathode ray tube. In other words, the resulting traces can be considered to be superposed. The spot traverses the face of the cathode ray tube synchronously with the scanning rate at the transmitting end of the facsimile system. Assuming the spot traverses to be horizontal, the spot positions at opposite ends of every trace are displaced vertically by the same distance. The diameter of the spot must be less than the vertical displacement distance; the vertical displacement between the ends of each horizontal trace corresponds to the distance between scanned lines at the transmitting end of the facsimile system. A camera is mounted adjacent the cathode ray tube and through its lens system focuses the face of the cathode ray tube in the focal plane occupied by the film in the camera. Both the cathode ray tube and the camera are enclosed in a light shield. The camera employs roll film which is caused to move continuously transversely to the cathode ray tube traces and at a constant rate equal to the rate of vertical movement of the spot on the cathode ray tube face. By this arrangement equally spaced transverse lines are recorded on the film. If the spot size is too large, the succeeding lines recorded on the film overlap.

The spot intensity varies instantaneously in accordance with the shade of the scanned portion of the message at the facsimile transmitter. The lines recorded on the film form a composite picture of the transmitted facsimile message. Contrast on the facsimile recording is directly related to average spot intensity. Tonal range is directly related to the dynamic range of spot intensity; the latter is directly related to the amplitude of the signal placed on the control grid of the cathode ray tube. For a good facsimile recording, it is necessary to adjust cathode ray tube focus, camera focus, average spot intensity, and dynamic range of spot intensity.

It has been found that under such critical conditions, focusing is a complex procedure. The cathode ray tube spot must be focused and the recording camera lens must be focused. It also has been found that under such critical conditions, it is difficult to properly adjust the average intensity and the dynamic intensity range of the spot on the cathode-ray tube face so as to afford the proper tonal range and contrast on the facsimile recording film.

This invention provides a convenient means for aiding in properly focusing a cathode ray tube, an associated camera, and for aiding in properly adjusting the average intensity and the dynamic intensity range of the cathode ray tube spot to produce a good facsimile recording on the film in the associated camera. For this purpose, there is provided a phototube suitably mounted adjacent the face of the cathode ray tube to generate an output proportional to the instantaneous intensity of the cathode ray tube spot. An amplifier is connected to the output end of the phototube. A direct current voltmeter that is connected in the output amplifier circuit of the phototube provides a measure of the average spot intensity. A test oscilloscope is connected to the output of the amplifier. The amplified output voltage of the phototube is applied to the vertical input of the test oscilloscope. The oscilloscope aids in adjusting the dynamic spot intensity range through adjustment of the input signal amplitude. With the addition of an optical test grid in the focal plane of the camera the arrangement aids in obtaining sharp spot focus through manual adjustment of the cathode ray tube focus control. The optical test grid consists, in one form, of a transparency formed with parallel opaque bars. Each opaque bar is of constant width. The widths of the opaque bars differ from one another and vary stepwise to cover a range of widths, which range is proportional to the anticipated range of spot size. The widths of the transparent spaces between the opaque bars correspond to the widths of the adjacent opaque bars. The optical test grid is positioned so that the opaque bars intercept the lens focused light beam originating at the cathode ray tube spot in the absence of an intensity modulating signal. When the spot traverses the cathode ray tube face, the lens focused light beam originating at the spot is interrupted by the grid bars to produce pulses of light at the phototube. The resulting voltage variation generated by the phototube behind the optical test grid is amplified and is displayed on the test oscilloscope. The focus controls are adjusted till the narrowest bar of the test grid completely intercepts the lens focused light beam; the display on the test oscilloscope is used as an aid in adjusting the focus controls. In this manner, the device is used for aiding in focusing the cathode ray tube and the camera lens, and is further used for aiding in adjusting the average spot intensity and the dynamic intensity range of the spot.

An object of this invention is to provide a device to aid in focusing a cathode ray tube and a camera associated therewith.

A further object is to provide a device to aid in focusing a cathode ray tube.

A further object is to provide a device to aid in focusing a camera.

A further object is to provide a device to aid in adjusting the average intensity of a spot under operating conditions to afford good contrast.

A further object is to provide a device to aid in setting the average intensity and the dynamic intensity range of the spot on a cathode ray tube under operating conditions to obtain proper contrast and the complete range of tone gradation.

A further object is to provide a device to aid in focussing the spot on a cathode ray tube face, focusing an associated recording camera, and setting the average intensity and the dynamic intensity range of the spot under operating conditions.

Other objects and many of the attendant advantages of this invention will be readily appreciated as the same becomes better understood by reference to the following detailed description when considered in connection with the accompanying drawings wherein the single figure is a simplified diagram of an embodiment of this invention for illustrating a novel arrangement for focusing and spot intensity adjustment in a facsimile recorder having a cathode ray tube and camera.

The disclosed embodiment may include either one or two multiplier phototubes depending upon the physical arrangement. In other words, one multiplier phototube may be physically arranged in combination with an adjustable mirror for not only aiding in focusing the cathode ray tube and camera but also to aid in setting the dynamic brightness range while recording is in progress. On the other hand, an alternate arrangement including two separate phototubes may be used, one for aiding in focusing and one for aiding in setting the dynamic brightness range. Where the latter case prevails, it is desirable that plugs be associated with each whereby either plug may be connected in circuit.

In operation this invention provides a convenient means to aid in forcusing the spot of a cathode ray tube, an associated camera, and in addition, during normal operation of the cathode ray tube and camera, to aid in adjusting the average intensity and the dynamic intensity range of the spot on the face of the cathode ray tube in order to obtain a good facsimile recording on the film in the camera. Initially, and without intensity modulation, it is more convenient to adjust the cathode ray tube focus and camera focus by eye. With visual access to the face of the cathode ray tube, the cathode ray tube focus control is adjusted to obtain the narrowest trace possible by direct observation. Subsequently, with the aid of a translucent piece of material of substantially the same thickness as the recording film, mounted in the focal plane of the camera, the camera lens is adjusted while observing the image of the trace on the translucent piece of material. Then, for finer focusing, resort is had to the electronic means described. With the optical test grid placed in position in the focal plane as shown in the figure, first the cathode ray tube focus control is adjusted for best results as seen on the oscilloscope, i.e. until the waveform on the oscilloscope has the maximum number of pulses of the same amplitude or maximum amplitude. Then the camera lens is adjusted for best results as seen on the oscilloscope, i.e. until the waveform on the oscilloscope has the maximum number of pulses of the same amplitude or maximum amplitude. After focusing, roll film is inserted in place of the test grid. Then through the use of mirrors and either a second phototube or even the same phototube, the intensity control of the cathode ray tube is adjusted during actual operation while observing the reading on the intensity meter to afford the proper contrast on the film. The signal amplitude input on the control grid of the cathode ray tube is concurrently adjusted while observing the oscilloscope to provide proper tonal range on the recording film.

Obviously many modifications and variations of the present invention are possible in the light of the above teachings. It is therefore to be understood that within the scope of the appended claims the invention may be practiced otherwise than as specifically described.

I claim:

1. In a recording system; a cathode ray tube with an adjustable focus control and deflection means for cyclically deflecting the spot over a selected path across the tube face, a camera for supporting film in a particular position therein for recording a moving image of the cyclically deflected spot and also having a lens and lens focus means for focusing an image of the spot on film supported in said position, said camera being supported adjacent to and sighted on the face of the cathode ray tube, means to guide the focusing of the cathode ray tube and camera before film is inserted in the camera, said means including an optical test grid removably supported by the camera in the film position and having alternate light opaque and light transparent areas in sequence in the path of the cyclically moving image of the cathode ray tube spot, the size of at least one of the two varieties of areas varying stepwise from smallest to biggest from one end of the sequence of areas to the other end of the sequence of areas, the range of stepwise size variation being such that a smaller one of the stepwise varying areas intercept the image of the spot without overlap onto adjacent areas when the desired degree of focus is achieved, light sensitive means supported in the camera to intercept all the light passing through the optical test grid and to generate voltage substantially proportional to light incident thereto, an oscilloscope for displaying the waveform of the generated voltage, one of the orthogonal deflection means of said oscilloscope coupled to said light sensitive means, the orthogonal deflection means of said oscilloscope deflecting the spot thereof synchronously with deflection of the spot on the cathode ray tube whereby with the cathode ray tube spot intensity kept constant, the focus of said cathode ray tube and of said camera is sharpest when the undulation of the voltage waveform display on the oscilloscope are of maximum achievable amplitude and steepness.

2. In a recording system as defined in claim 1 further including an adjustable average-spot-intensity control for said cathode ray tube; means to aid in adjusting said intensity control for proper average film exposure in said camera by an intensity modulated spot on the face of said cathode ray tube, said means including second light sensitive means, means selectively movable into and out of position for diverting the light passing through said camera lens to said second light sensitive means, and an average intensity meter coupled to said second light sensitive means for indicating average spot intensity, one orthogonal deflection means of said oscilloscope also coupled to said second light sensitive means for indicating dynamic range of the spot intensity.

3. In the recording system defined in claim 1 wherein the sizes of both the light opaque areas and the light transparent areas together vary stepwise.

4. Apparatus for aiding in focusing a camera comprising means supported at a fixed distance from the camera for directing a spot of light of unvarying intensity to the camera and for cyclically deflecting the spot of light over a selected path transversely to the spacing between said means and said camera, an optical test grid removably supported in said camera in the position occupied by film when the camera is recording and having alternate light opaque and light transparent areas in sequence, said optical test grid being so oriented that the image of the spot on the test grid traverses all said areas, the size of at least one of the two varieties of said areas varying stepwise from smallest to biggest from one end of the sequence of areas to the other end of the sequence of areas, the range of stepwise size variation being such that a smaller one of the stepwise varying areas completely intercepting the image of the spot when the desired degree of focus is achieved, light sensitive means supported in the camera to intercept all the light passing through the optical test grid and to generate voltage substantially proportional continuously to light incident thereto, an oscilloscope for displaying the waveform of the generated voltage, one of the orthogonal deflection means of said oscilloscope coupled to said light sensitive means, the other orthogonal deflection means of said oscilloscope deflecting the spot thereof synchronously with deflection of light spot from said means, whereby when the camera is focused sharpest camera focus is indicated when the undulations of the voltage waveform display on the oscilloscope are of maximum achievable amplitude and steepness.

5. Apparatus for aiding in focusing a camera as defined in claim 4 wherein the sizes of both the light opaque areas and the light transparent areas together vary stepwise.

6. Apparatus to guide in the focusing of a cathode ray tube luminous spot comprising light sensitive means for converting a varying level of incident light into a substantially proportional varying voltage, an oscilloscope for displaying the varying voltage, one of the orthogonal deflection means of said oscilloscope coupled to said light sensitive means, and an optical test grid supported in front of said light sensitive means and having alternate light opaque and light transparent areas in sequence, the sizes of at least one of the two varieties of the areas in a direction transverse to the areas varying stepwise in one direction from one end to the other end of the sequence of the areas, the range of sizes being such that light from a cathode ray tube spot of the desired degree of focus can be completely intercepted by a smallest area in the sequence of areas, whereby when said optical test grid is disposed between a cathode ray tube face and said light sensitive means and ambient light is blocked and a luminous spot that is substantially unmodulated in intensity is produced on the cathode ray tube face and is deflected along a path on the tube face that is transverse to the sequence of areas on said optical test grid, and the other orthogonal deflection means of said oscilloscope deflects the spot thereof synchronously with deflection of the cathode ray tube spot, the light that is directed from the cathode ray tube spot toward said light sensitive means repeatedly transverses said sequence of areas, and oscilloscope affords an indication as to the increase or decrease of sharpness of the cathode ray tube spot focus as the cathode ray tube spot focus is adjusted in terms of increase or decrease of amplitude and steepness of the undulations of the voltage waveform display on said oscilloscope.

7. Apparatus as defined in claim 6 further comprising light focusing means supported in front of said optical test grid to focus an image of the cathode ray tube spot on said optical test grid.

8. Apparatus as defined in claim 7 wherein the sizes of both the light opaque areas and the light transparent areas together vary stepwise.

References Cited in the file of this patent

UNITED STATES PATENTS

| | | |
|---|---|---|
| 2,480,423 | Simmon | Aug. 30, 1949 |
| 2,483,147 | Mol | Sept. 27, 1949 |
| 2,596,741 | Tyler | May 13, 1952 |
| 2,763,833 | Brumbaugh | Sept. 18, 1956 |